United States Patent Office 3,575,754
Patented Apr. 20, 1971

3,575,754
MANUFACTURE OF THERMOPLASTIC
SHEET MATERIAL
Alan Duerden, Hyde, England, and Samuel Gourley,
Saltcoats, Scotland, assignors to Imperial Chemical Industries Limited, London, England
Continuation-in-part of application Ser. No. 255,382,
Jan. 31, 1963. This application June 11, 1968, Ser.
No. 736,228
Claims priority, application Great Britain, Jan. 31, 1962,
3,689/62
Int. Cl. B32b 5/18, 31/18
U.S. Cl. 156—79  11 Claims

ABSTRACT OF THE DISCLOSURE

A process for making a thermoplastic sheet which comprises the steps of progressively spreading a paste of a thermoplastic material upon a continuously moving silicone elastomer band having a predetermined surface configuration, heating the paste thereby effecting gelation of said thermoplastic material as an integral sheet and removing the hot sheet from the band. In preference the sheet is provided with a backing material. The process is particularly suited to the manufacture of sheet from pastes based on polymers or vinyl chloride. The paste may be applied on the band in two distinct applications using different pastes for each application. Typically a first layer is formed on the band using a paste which does not include a blowing agent and then a second layer is formed on top of the first layer using a paste which includes a blowing agent. When the double layer is heated the blowing agent decomposes forming a multitude of cells in the second layer and at the same time the first and second layers are gelled. The silicon elastomer band may have a smooth or contoured surface pattern. Also the hot sheet may be embossed immediately after it is removed from the band.

---

Figure 1:
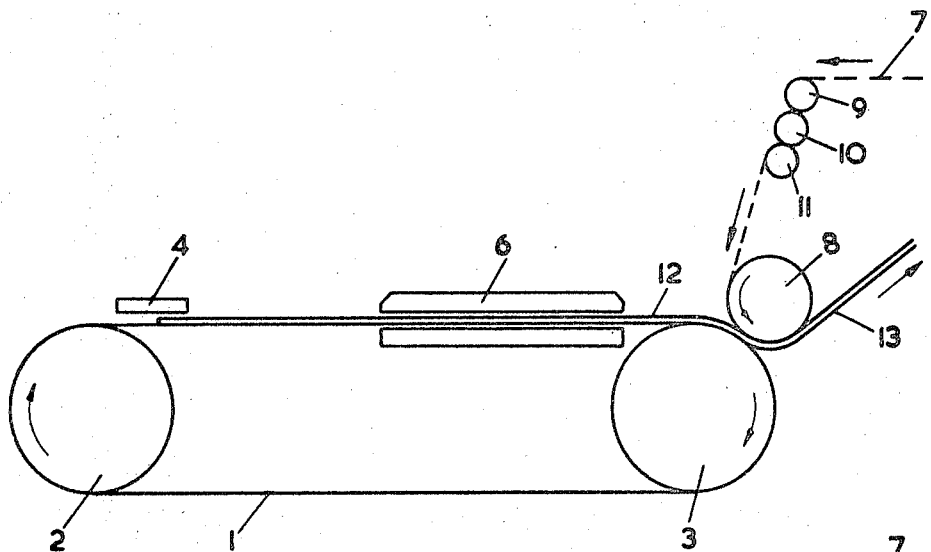

This is a continuation-in-part of application Ser. No. 255,382, filed Jan. 31, 1963, now abandoned.

This invention relates to the manufacture of plastic sheet or plastic coated fabric. The invention particularly relates to a new and improved continuous process of making a thermoplastic sheet having a desired surface configuration.

Embossing rollers and the like used for producing the so-called embossed pattern on plastic sheet materials normally carry on their surfaces the reverse pattern of the design required on the plastic so that when it is impressed on to a receptive surface the hills and valleys of the pattern become the valleys and hills respectively in the plastic material. These reversed patterns or embossing designs are applied to the embossing means by a variety of techniques such as etching, engraving and milling. It is well known in the industry that the finer the embossing design required, and in the limit the smoother the surface required, the greater is the difficulty in reproducing it on the embossing surface.

Embossing means have in the past been exclusively made from metals and it has been usual to use steel. The engraved surfaces of the embossing means are extremely expensive to prepare and are extremely prone to accidental damage as are also highly polished surfaces used in the manufacture of plain sheet.

Our present invention proposes the use of embossing means which are non-metallic and are made from organo-polysiloxane elastomers referred to hereinafter as silicone elastomers. These silicone elastomers are prepared by a vulcanisation or curing of a polysiloxane gum composition at room or elevated temperature.

The present invention is based on the discovery of a continuous process whereby textured and decorative thermoplastic sheet products having a variety of surface configurations can be formed by casting and moulding a paste of a thermoplastic material on the surface of a silicone elastomer band. The process uses a silicone elastomer band which reproduces on the moulded thermoplastic material the desired surface configuration.

The embossing means is in the form of a band which is endless or of long continuous length. It may be provided with a reinforcement of fabric or metal or other convenient material and the reinforcement may be provided as a backing or may be embodied in the silicone elastomer.

By "plastic sheets" we denote sheets of thermoplastic polymeric material, e.g. vinyl polymers and copolymers, and copolymers or terpolymers of acrylonitrile butadiene and styrene, which may be compounded with pigments, plasticisers and other additives. Such plastic sheet may be unsupported or supported by a substrate or knitted, woven or felted material.

An object of our invention is a method of manufacturing embossed plastic sheet, the method being characterized by the use of an embossing surface which is an organo-polysiloxane elastomer.

The advantages of our process over any hitherto used can be enumerated as follows:

(1) The embossing means is not readily damaged.
(2) The exact reproduction on the plastic sheet of the surface texture required can readily be achieved.
(3) The plastic sheet is readily stripped from the silicone embossing surface, even if the embossing operation has been conducted at a relatively high temperature. Our process therefore presents the advantage that we can choose and employ plastic materials suitable for the production of embossed products having a high emboss retention temperature. Such products are desirable if they subsequently have to be heated to a high temperature for example when they are used for vacuum covering of articles or bonded to steel. With conventional products it has been found that embossed patterns, in general, are lost when the products are used in vacuum covering operations or when laminated to a metal, as both of these processes involve high temperatures. Material made according to our invention has been found to be resistant to such high temperature manipulation without loss of emboss pattern.

One method of manufacturing continuous embossed plastic sheet according to our invention consists in applying by spreading a paste of thermoplastic material on to an embossing surface in the form of a band, gelling the paste by heating and stripping from the band when it is in a gelled or semi-gelled state.

The sheet produced bears an embossed pattern which is a perfect reproduction of that provided on the band.

If desired a supporting substrate such as a fabric may be laminated to the plastic sheet while it is still hot. We have found that only a light pressure is necessary to bring about this lamination and this may be conveniently applied by means of a light pressure roller. It has also been found that the bond between the plastic sheet and the supporting substrate may be improved by heating both the substrate and the plastic sheet to approximately the same elevated temperature and bringing about the lamination while both are still at high temperature. The supported plastic sheet is stripped from the band while it is still hot.

The process, therefor, comprises the steps of progressively spreading a paste of a thermoplastic material upon a continuously moving silicone elastomer band having a predetermined surface configuration, heating the paste thereby effecting gelation of said thermoplastic material as an integral sheet and removing the hot sheet from the band.

The present method is generally suited to the manufacture of thermoplastic sheet from the usual polymeric materials, particularly from polymers or copolymers of vinyl chloride. The polymeric material, in particulate form, is suspended in a suitable plasticiser, such as a mixture of di-alkyl phthalates, to form a paste of such consistency that it will readily mould itself to the surface of a plain or patterned band. Generally pastes having a viscosity in the range 100 to 300 poises are suitable, however for certain application pastes having viscosities outside this range may be found more suitable.

The paste may also contain other conventional ingredients. In particular it will generally contain a heat stabiliser and a pigment. Other ingredients which may be included in the paste are lubricants, fillers and ultra-violet light stabilisers. When a layer in the sheet is required to have a cellular form then that layer may be formed using a paste which includes a suitable blowing agent, for example azodicarbonamide. The paste is heated to a temperature which causes decomposition of the blowing agent with evolution of a gas, usually nitrogen, which is retained in the gelled layer in a multitude of cells.

The paste may be applied on to the band in one or more separate applications in a conventional manner, for example by means of a scraper knife or a roller coater technique. Thus where the embossed pattern provided on the band includes very fine detail or is in the form of a multiplicity of ciliary fibres, as is the case when artificial suede is being made, then the first application may be made using a lower viscosity paste than would normally be used. In this way the "valleys" of the pattern on the band are completely filled during the first application of paste and this ensures a satisfactory finish on the final product—this finish being a perfect reproduction of the band pattern. Apart from using different viscosity pastes for each application we have found that a particularly attractive product may be obtained using different coloured pastes for each application. Thus with suitable patterns it is possible to fill the deeper portions of the pattern with the first paste application and the remainder with the second paste application. In this way an inlaid two-tone effect is obtained on the finished plastic sheet. Such two-tone effects have not hitherto been obtainable on plastic sheets.

A particularly desirable product may be produced by first applying a layer of a composition which does not contain a blowing agent and then applying a second layer of a composition containing a blowing agent on top of the first applied layer. When the superimposed layers are heated, gelation of both layers and blowing of the second layer is effected.

This method of manufacture has a number of particular advantages over and above those already mentioned. Using it an embossed plastic sheet can be produced in one operation and because of this the likelihood of gathering dirt and dust on the surface of the plastic sheet during manufacture is virtually eliminated and the efficiency of manufacture is thereby increased. A knitted fabric can readily be used as a backing material in contrast to conventional methods where the pressure used for embossing fabric supported plastic sheet is sufficient to cause considerable penetration of the knitted fabric by the soft plastic material and to cause distortion of the knitted fabric.

The present invention enables low pressures to be employed and with a consequence that little penetration takes place. There is in addition the advantage that the difficulties associated with distortion of the knitted fabric in handling are largely avoided.

Conveniently the backing material is laminated to the hot sheet as the sheet is being removed from the band. In practice if a stripping roller is used to remove the hot sheet from the band then this may also serve as a laminating roller. Alternatively the backing material may be attached to the layer of ungelled paste before the latter is heated. In this case the paste and the substrate will be conveyed through the heating chamber on the band.

The thermoplastic material is gelled by passing the coated band through a heating chamber which may take any of the usual forms, for example a gas fired hot air heating chamber. In the case of polyvinyl chloride the paste is heated to a temperature of 180° C. or more during passage through the heating chamber. The residence time within the chamber will, of course, depend on the temperature and the residence time may be reduced as the temperature within the chamber is increased.

Essentially the sheet is removed from the band while the sheet is hot. This offers a number of advantages:

By removing the sheet from the band while it is still hot the heat requirements of the process are reduced; the band, if not cooled, takes up less heat in the next cycle when the applied paste is gelled.

Further, we have found that the band when hot absorbs plasticiser from the layer of thermoplastic material and, if the band is allowed to cool, some of this plasticiser exudes onto the surface of the band. This exuded plasticiser affects the appearance of the sheet produced during the next cycle, the plasticiser having a whitening effect on the colour of the laminate surface so making colour matching of different batches more difficult.

Another advantage arises when the sheet produced includes a layer formed from a thermoplastic paste which includes a blowing agent as one of its ingredients. During passage through the heating chamber the paste is heated to a temperature which causes decomposition of the blowing agent with evolution of a gas which is retained in the gelled layer in a multitude of cells. In practice the layer of thermoplastic material is heated to a temperature considerably above that at which the blowing agent decomposes so that "blowing" continues even when the gelled layer on the band is passed out of the heating chamber. It is very difficult to produce a silicone elastomer band of uniform thickness and consequently, if the gelled layer is cooled on the band, it is very difficult to ensure uniform cooling. As a result, those parts of the layer which cool slower than the rest are more highly blown and a non-uniform product of uneven thickness is obtained.

We have found that, if the sheet is stripped from the casting band while the sheet is hot, and then cooled externally of the band, more uniform and more rapid cooling can be achieved and consequently a more uniform product can be obtained.

Also, by removing the sheet from the band while the sheet is hot it can readily be subjected to an embossing operation without the necessity of having to reheat the sheet. Conveniently the hot sheet is embossed immediately after it is removed from the band by, for example, a cold embossing roller having a surface configuration which it reproduces, in reverse, on the sheet. If the surface of the silicone elastomer band is smooth then the embossing operation will serve to provide the sheet with, what might be termed, a primary embossed pattern. However, when the surface of the silicone elastomer band has some other, for example grained, surface configuration then the embossing operation will serve to provide the sheet with a secondary or over-embossed pattern. By introducing into the process of the present invention the further step of embossing the hot sheet after it has been removed from the band it is possible to manufacture small quantities of sheet material which otherwise could not be economically produced because of the cost of making a band with the required surface configuration.

Depending on the surface configuration which is required on the thermoplastic sheet the silicone elastomer casting band may have a smooth or contoured, for example embossed, surface pattern.

The invention will be more fully understood from the following description of various types of apparatus for carrying out the process as shown diagrammatically in the accompanying drawings.

In each type of apparatus shown an endless reinforced silicone elastomer band 1 having a predetermined surface configuration is caused to move along a closed path by means of rotating rollers 2 and 3 between which the band is tensioned.

A paste of the thermoplastic material was formed in a suitable plasticizer. Included in the paste were stabilisers, fillers and pigments. Before use the paste was passed through a 60 mesh sieve and then de-aerated. The viscosity of the paste used was in the range 100 to 300 poises.

Referring to FIG. 1, the paste was applied as a continuous coating on the patterned surface of the moving band 1 by means of a coating device 4, in the form of a roller coating device. The band conveyed the coating through a heating chamber 6 so that the coating was partially or completely gelled to form a hot sheet 12.

At the same time a sheet of a knitted fabric 7 having on one surface a coating of a cellular thermoplastic material was fed continuously over heated drums 9, 10 and 11 and into contact with a fixed clearance roller 8.

The coated fabric 7 and the sheet 12 combined to form a laminate 13 which comprised a sandwich in which the cellular layer was interposed between the fabric and an embossed non-cellular thermoplastic layer. The hot laminate was stripped off the band at roller 8 and rapidly cooled.

Figure 2:
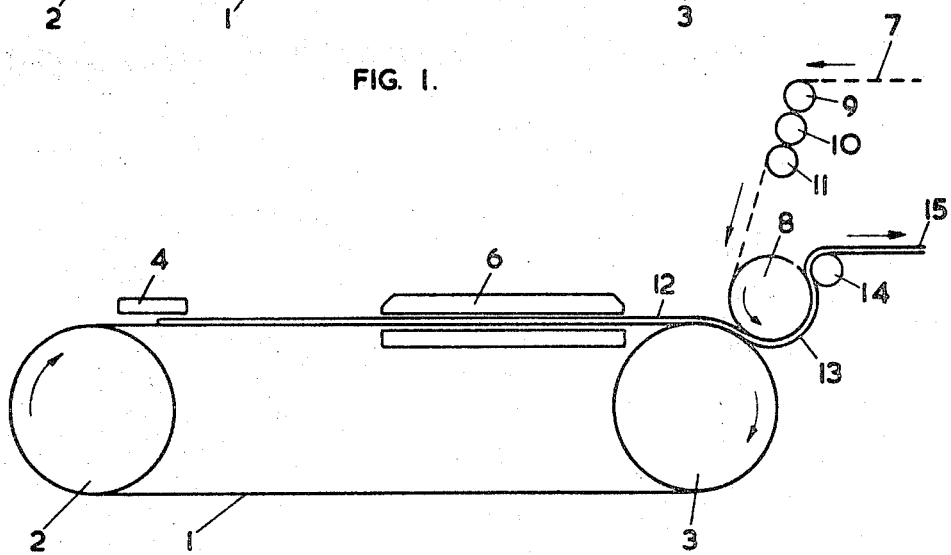

In the apparatus shown in FIG. 2 a band having a smooth surface was used. A suitable paste was applied as a coating on the moving band 1 by means of a coating device 4 in the form of a roller coating device. The coating was conveyed through a heating chamber 6 by the moving band so that the coating was partially or completely gelled to form a hot sheet 12.

At the same time a sheet of a suitable fabric 7 was fed continuously over heated drums 9, 10 and 11 and into the nip formed between a pressure roller 8 and the portion of the band in the region of the roller 3.

The fabric 7 and sheet 12 combined to form a laminate 13 which was hot-stripped from the band and passed around the periphery of the roller 8 and into the nip formed between that roller and a cold embossing roller 14. The hot plastic surface of the laminate 13 was provided with an embossed pattern which was the reverse of that provided on the embossing roller 14. The embossed sheet 15 was then cooled in a conventional manner (not shown).

With the same apparatus a particularly desirable product was produced incorporating as a supporting substrate, instead of the fabric 7, a knitted fabric having on one surface a coating of a cellular thermoplastic material. In this case, however, in order to prevent collapse of the cellular layer during the lamination and embossing stages, rollers 3, 8 and 14 were so spaced as to provide the necessary clearance in which lamination and embossing could be carried out without crushing the cellular layer. The laminate so formed consisted of a sandwich in which the cellular layer was interposed between the knitted fabric and an embossed non-cellular thermoplastic layer.

Figure 3:
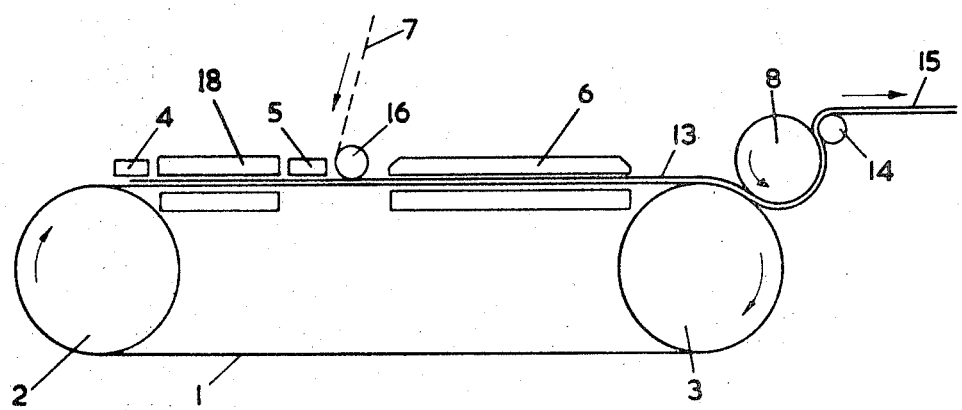

In the apparatus shown in FIG. 3 two coating devices 5 and 4 were utilised. Coating device 4 which was a roller coater, served to apply a layer of a suitable paste, excluding a blowing agent, on the smooth surface of the moving band. The moving band conveyed the paste layed to a second coating device 5, which also was a roller coater, the second coating device serving to apply a layer of a suitable paste, including a blowing agent on top of the first applied layer. Optionally, before the second layer is applied the first layer of paste is gelled by subjecting it to a heating operation by, for example, conveying the paste through a hot air heating chamber 18.

A knitted fabric 7 was fed continuously around a fixed clearance roller 16 by means of which the fabric was adhered to the upper surface of the paste layer.

The band conveyed the three component lay-up through a heating chamber 6 which, in addition to causing gelation of both paste layers caused decomposition of the blowing agent in the second applied layer so that this second layer was rendered cellular.

The three layer laminate 13 so formed was removed from the moving band by means of a fixed clearance stripping roller 8. The laminate was passed around the periphery of roller 8 and embossed by means of a fixed clearance roller 14. The embossed sheet 15 was cooled in a conventional manner (not shown).

Figure 4:
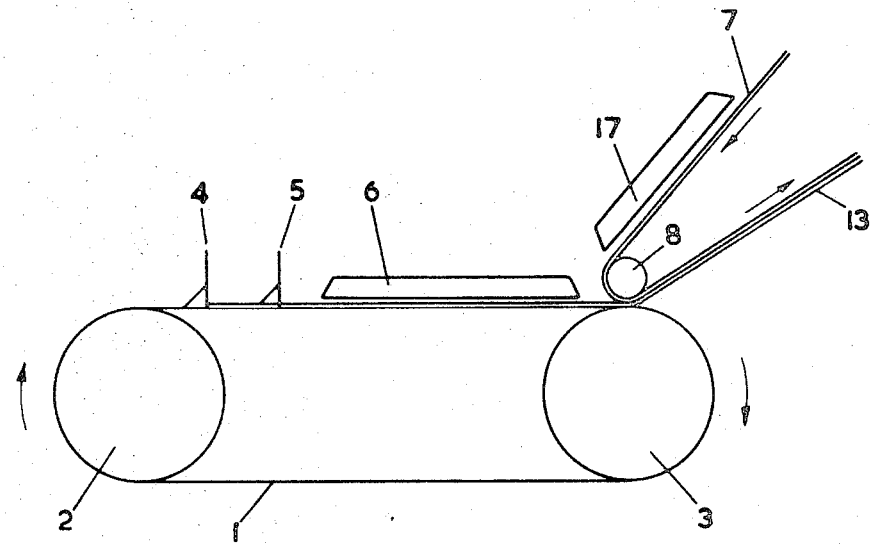

In FIG. 4 we show an alternative continuous band arrangement to that depicted in FIG. 1. The patterned endless band 1 of supported silicone elastomer is tensioned between drive rollers 2 and 3. Thermoplastic paste is spread on to the moving band by means of scraper knife 4 followed by fixed clearance knife 5. The resulting layer is gelled by heat provided by radiant heater 6.

A fabric backing 7 which has been pre-heated by means of radiant heater 17 is continuously fed on to the plastic surface via pressure roller 8 and lamination takes place. To ensure good lamination both the plastic layer and the fabric backing are heated right up to the pressure roller 8.

This roller 8 also serves to remove the laminate 13, so formed, from the band surface. The laminate is still hot and it is necessary to cool it before it is batched.

What is claimed is:

1. A continuous process for making thermoplastic sheet comprising the steps of progressively spreading a paste of a thermoplastic material upon a continuously moving silicone elastomer band having a predetermined surface configuration, heating the paste thereby effecting gelation of said thermoplastic material as an integral sheet and removing the hot sheet from the band.

2. A continuous process as claimed in claim 1 including the further step of subjecting the hot sheet to an embossing operation immediately after it is removed from the band.

3. A continuous process as claimed in claim 2 in which the surface of the band is smooth, the embossing operation serving to provide that surface of the hot sheet which is in contact with the band with a primary embossed pattern.

4. A continuous process as claimed in claim 2 in which the surface of the band has a surface configuration which serves to provide the sheet with a primary embossed pattern, the further step of embossing the hot sheet after it has been removed from the band serving to provide the sheet with a secondary or over-embossed pattern.

5. A continuous process as claimed in claim 1 in which the paste used has a viscosity in the range 100 to 300 poises.

6. A continuous process as claimed in claim 1 in which the hot sheet is laminated to a sheet of a knitted fabric having on one surface a coating of a cellular thermoplastic material, the cellular coating and the hot sheet being adjacent to one another in the laminate so-formed.

7. A continuous process as claimed in claim 1 in which the paste is applied on the band as two separate superimposed layers.

8. A continuous process as claimed in claim 7 in which the first applied layer is formed with a paste composition which does not contain a blowing agent and the second applied layer is formed with a paste composition which contains a blowing agent.

9. A continuous process as claimed in claim 8 in which a knitted fabric is laminated to the free surface of the thermoplastic material before the hot sheet is removed from the band.

10. A continuous process as claimed in claim 9 in which the knitted fabric is adhered to the upper layer of ungelled paste before it is heated.

11. A method of manufacturing supported continuous embossed plastic sheet comprising spreading a paste of thermoplastic material on to an organopolysiloxane elastomer surface in the form of a band, heating the paste to gel it and laminating the sheet so formed to a heated substrate and immediately removing the hot laminate from the band.

References Cited

UNITED STATES PATENTS

| | | | |
|---|---|---|---|
| 2,714,226 | 8/1955 | Axelrad | 264—337 |
| 3,061,873 | 11/1962 | Supitilov et al. | 264—313 |
| 3,066,351 | 12/1962 | Schriner | 18—4 |
| 3,098,262 | 7/1963 | Wisotzky | 264—212 |
| 3,152,002 | 10/1964 | Wisotzky et al. | 117—21 |

LELAND A. SEBASTIAN, Primary Examiner

U.S. Cl. X.R.

156—78, 230, 231, 232, 238, 247